United States Patent [19]

Minichello

[11] Patent Number: 4,851,114
[45] Date of Patent: Jul. 25, 1989

[54] CLEANING APPARATUS FOR BAR SCREEN

[76] Inventor: Joseph R. Minichello, 32 Tern Ct., Bay Shore, N.Y. 17706

[21] Appl. No.: 154,858

[22] Filed: Feb. 10, 1988

[51] Int. Cl.$^4$ .................... B01D 35/02; B01D 29/38; E02B 5/08
[52] U.S. Cl. .................................. 210/143; 210/159; 210/162
[58] Field of Search ................ 210/159, 162, 413, 143

[56] References Cited

U.S. PATENT DOCUMENTS

| | | | |
|---|---|---|---|
| 2,128,345 | 8/1938 | Briggs | 210/162 |
| 2,291,103 | 7/1942 | Plummer | 210/159 |
| 3,482,698 | 12/1969 | Ostnas | 210/159 |
| 3,591,006 | 7/1971 | Daferner | 210/159 |
| 4,265,750 | 5/1981 | Meunier | 210/159 |
| 4,392,952 | 7/1983 | Fechter et al. | 210/159 |
| 4,472,273 | 9/1984 | Hagihara | 210/159 |
| 4,725,365 | 2/1988 | Albrecht, III | 210/159 |

FOREIGN PATENT DOCUMENTS

| | | | |
|---|---|---|---|
| 662004 | 4/1938 | Fed. Rep. of Germany | 210/162 |
| 1918091 | 10/1970 | Fed. Rep. of Germany | 210/159 |
| 2443935 | 4/1976 | Fed. Rep. of Germany | 210/159 |
| 2103739 | 7/1979 | Fed. Rep. of Germany | 210/159 |
| 151714 | 9/1982 | Japan | 210/159 |
| 1174915 | 12/1969 | United Kingdom | 210/159 |

*Primary Examiner*—Richard V. Fisher
*Assistant Examiner*—Linda S. Evans
*Attorney, Agent, or Firm*—Brumbaugh, Graves, Donohue & Raymond

[57] ABSTRACT

A bar screen cleaning apparatus in which a rake for cleaning the bar screen is raised and lowered by a transport system which includes an elongated flexible motor-driven train which transports the rake, a train track which extends substantially parallel to the bar screen at its lower end and curves at its upper end over the platform and a curved guide to maintain the train in engagement with the track and to guide the flexible train along the path of the curved track.

12 Claims, 5 Drawing Sheets

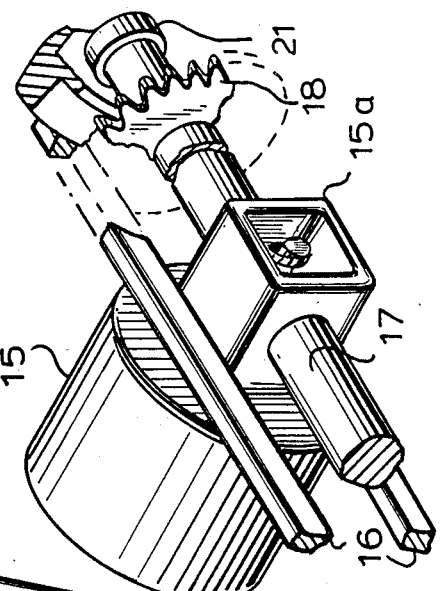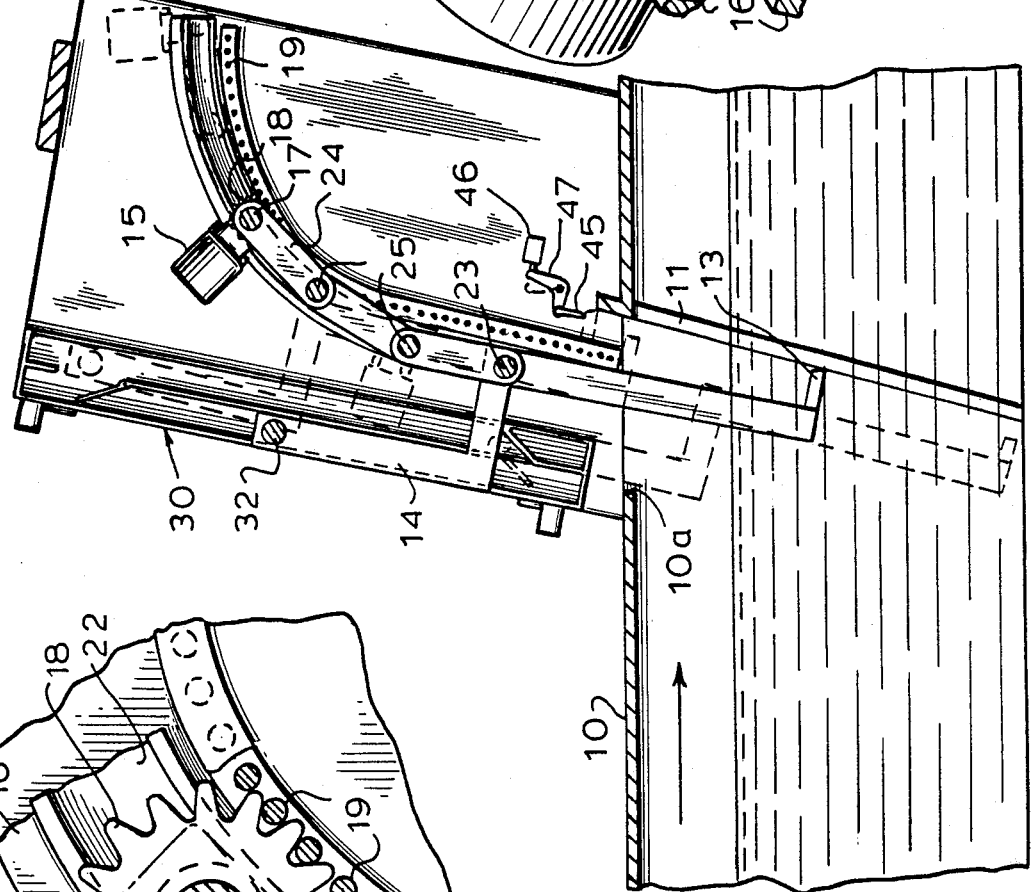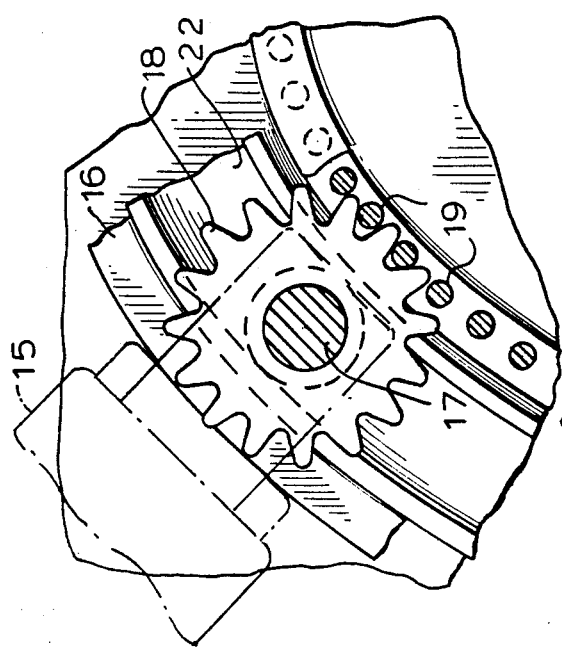

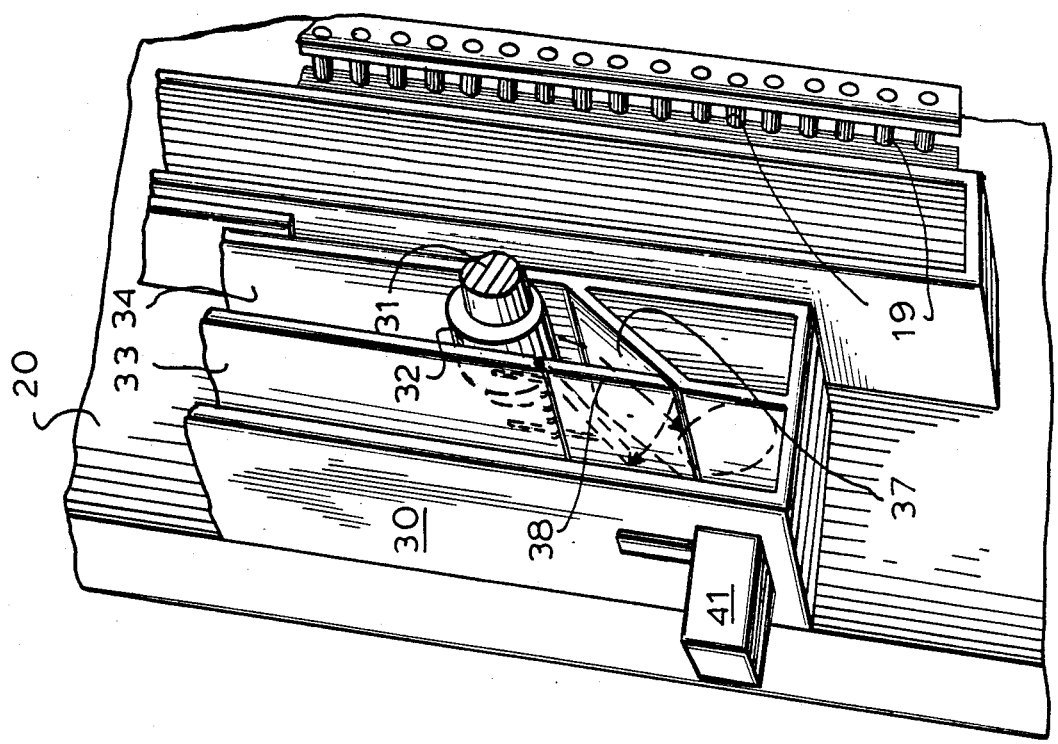
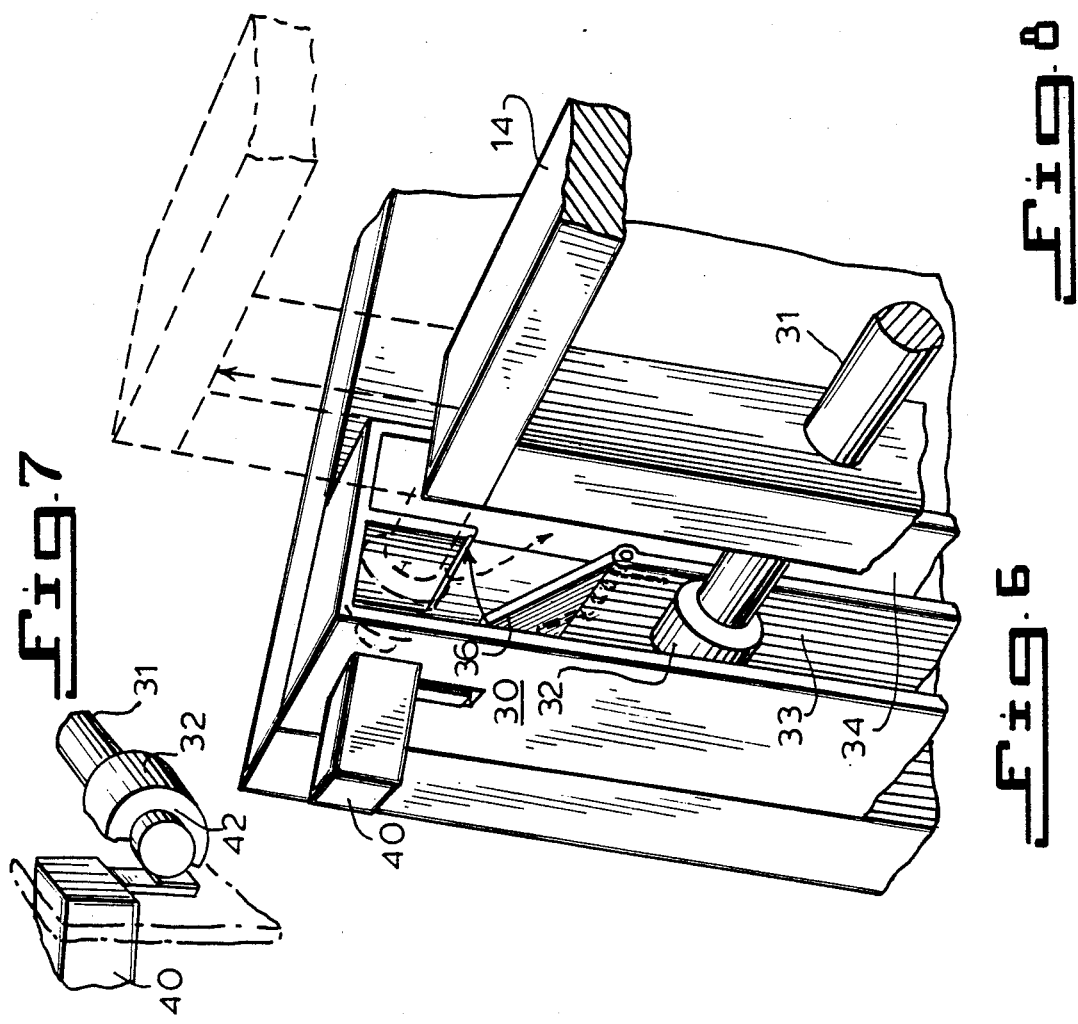

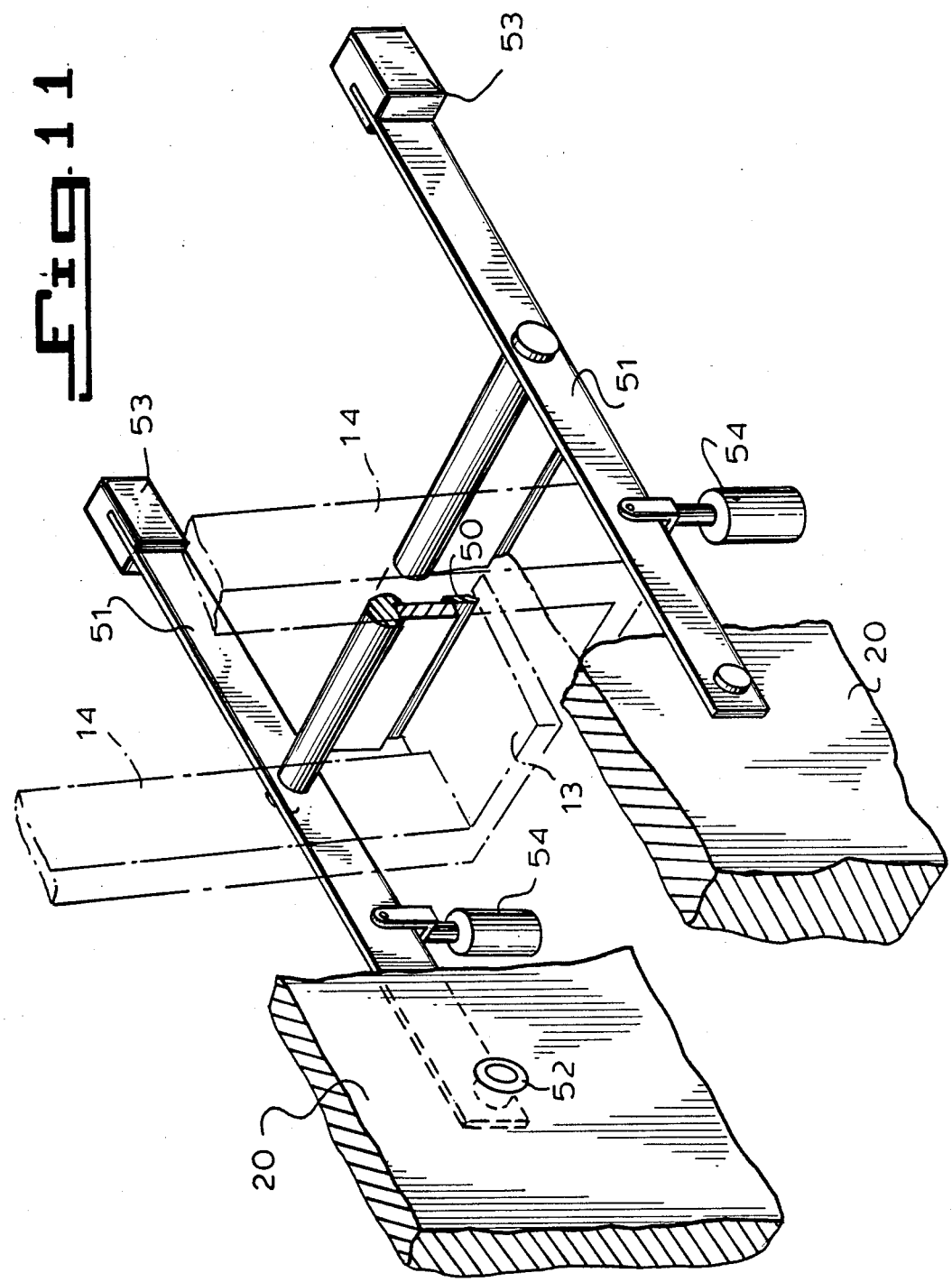

CLEANING APPARATUS FOR BAR SCREEN

BACKGROUND OF THE INVENTION

This invention relates to a bar screen cleaning apparatus for cleaning a bar screen of debris deposited thereon by the flow of waste water through a channel.

Bar screen cleaning apparatus is known and described, for example, in U.S. Pat. Nos. 3,482,698 and 3,591,006. The known bar screen cleaning apparatus usually embodies a relatively tall structure mounted above ah opening into the channel so that the repair and maintenance of such apparatus is both difficult and dangerous. For example, the cleaning apparatus described in the '006 patent includes a rake movable relative to the underwater bar screen to remove debris therefrom and to deposit the debris onto a platform adjacent the opening into the waste water channel. The rake is raised and lowered through the opening by a drive system which includes a pair of stationary, upright gear racks, motor-driven pinions which travel entirely around the upright gear racks, first upwardly in engagement with one side of the gear racks to raise the rake in cleaning, interfacing relation with the bar screen and then downwardly in engagement with the other side of the gear racks to lower the rake in spaced apart relation to the bar screen. A pair of closed channels guides the motor-driven pinions in their travel around the gear racks. Since this drive system extends in a relatively straight direction from a level within the channel opening to a height substantially above the platform and the opening to the channel, it is apparent that maintenance and repair of this drive system is both hazardous and difficult.

SUMMARY OF THE INVENTION

The object of the present invention is to provide a new and improved bar screen cleaning apparatus which can be serviced more easily and with greater safety.

In the bar screen cleaning apparatus of the invention, the rake is raised and lowered by a transport system which includes an elongated, flexible, motor-driven train which transports the rake, a train track which extends substantially parallel to the bar screen at its lower end and curves at its upper end over the platform and a curved guide to maintain the train in engagement with the track and to guide the flexible train along the path of the curved track. Since the upper end of the train moves back and forth along the track and across the platform while the lower end of the train is transporting the rake up and down relative to the bar screen, the track and train are accessible from the platform and the person servicing the transport system does not have to descend into the opening into the waste water channel or climb to any substantial height above the platform or the opening.

In a preferred form of the transport system the flexible train is displaced back and forth along the curved track by a motor-driven pinion located at or near the upper end of the train, and the train includes a flexible connection which transports a shuttle for the rake at or near the lower end of the train so that the motor-driven pinion follows the curved track while raising and lowering the shuttle. A guide channel independent of the transport system controls the pivotal displacement of the shuttle for the rake, thereby controlling the movement of the rake into and out of cleaning relationship with the bar screen.

DESCRIPTION OF THE DRAWINGS

For a more complete understanding of the invention, reference can be made to the detailed description which follows and to the accompanying drawings in which:

FIG. 3 is a section view taken generally along the line 3—3 of FIG. 1 looking in the direction of the arrows;

FIG. 4 is an enlarged side elevation of the drive system for raising and lowering the rake;

FIG. 5 is an enlarged perspective view of the drive system shown in FIG. 4;

FIG. 6 is a perspective view of the upper end of the guide channel system for pivoting the rake toward and away from the bar screen;

FIG. 7 is a perspective view illustrating the actuation of an electrical switch to reverse the direction of the drive motor;

FIG. 8 is a perspective view of the lower end of the guide channel system shown in FIG. 6;

FIG. 11 is a perspective view of an alternative cleaning wiper for the rake.

DESCRIPTION OF THE INVENTION

Figure 1:
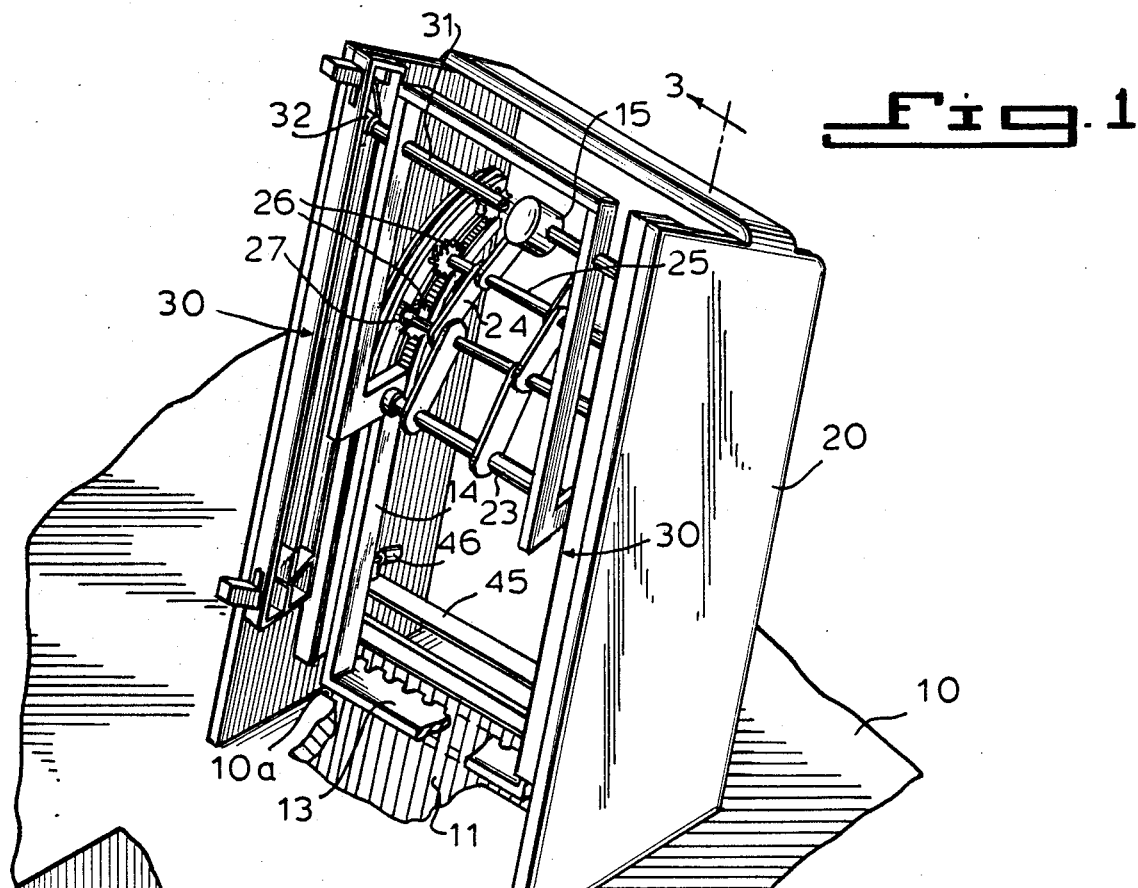
FIG. 1 is a perspective view of the bar screen cleaning apparatus of the present invention.
Figure 2:
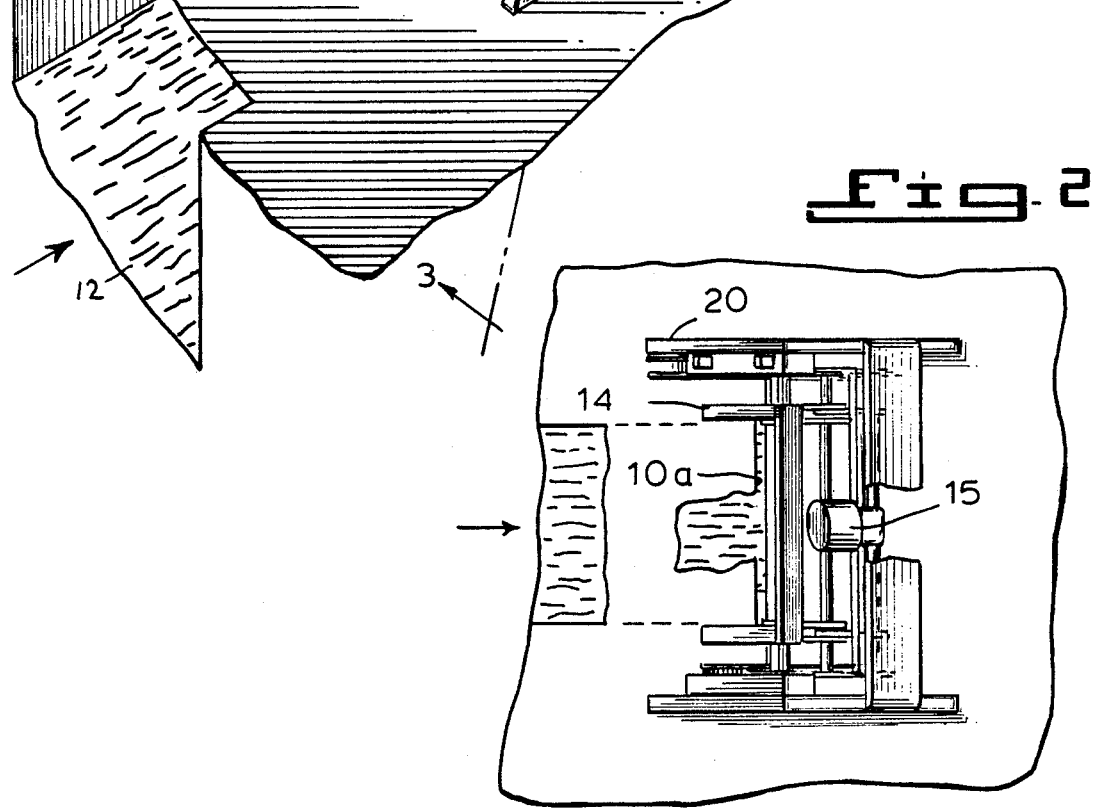
FIG. 2 is a plan view of the apparatus shown in FIG. 1.

The bar screen cleaning apparatus of the present invention, shown in FIG. 1, is mounted on a support surface or platform 10 above a bar screen 11 which is interposed in a stream 12 of waste water flowing through a channel to collect debris from the waste water flowing through the bar screen. The cleaning apparatus removes debris from the bar screen by a rake 13 which is lowered through an opening 10a in the platform to the lower end of the bar screen and then displaced toward the bar screen in interfacing cleaning relation therewith, so that as the rake moves upwardly relative to the bar screen, it removes the debris for deposit on the platform.

The rake 13 is supported at the lower end of a shuttle 14 which is raised and lowered by a transport system which includes a flexible train driven along the upper span of curved tracks by a reversible electrical motor 15. As best shown in FIGS. 4 and 5, the reversible motor 15 has a square shaped housing 15a at one end which is guided in its upward and downward travel between a pair of curved guide rails 16 which guide the motor in its travel and prevent the motor from rotating while it drives a transverse shaft 17 having sprockets 18 at both ends. The guide tracks for the train are gear racks 19 mounted on the inner surfaces of upright frames 20, and the sprockets 18 engage and travel along the gear racks. The gear racks extend substantially parallel to the bar screen at their lower ends to displace the rake in cleaning interfacing relationship with the bar screen during the upward travel of the train, and they curve at their upper ends to transport the train above the platform so that the guide tracks and motor-driven train are readily accessible from the platform. The extreme outer ends of the shaft 17 carry channel followers 21, which are accommodated in curved guide channels 22 mounted on the inner surfaces of the frame above the gear racks 19. As the motor 15 operates in one direction, the sprockets 18 move upwardly along the gear racks 19, and as the motor operates in the reverse direction, the sprockets move downwardly along the gear racks.

The shaft 17 is connected to a transverse pivot bar 23 of the shuttle 14 by linkages 24. The links of the linkages 24 are pivotally connected by transverse rods 25. Each of the transverse rods 25 carries a pair of sprockets 26 which engage the curved gear racks 19. Channel followers 27 at the ends of the rods are guided within the guide channels 22. The transverse pivot bar 23 of the shuttle also carries channel followers which are guided within the guide channels 22.

The assembly, which comprises the motor 15, the transverse shaft 17 having sprockets 18 at both ends, the linkages 24 pivotally connected by transverse rods 25, the track following sprockets 26 carried by the transverse rods and transverse pivot bar 23, provides an elongated, flexible motordriven train for raising and lowering the rake and shuttle relative to the bar screen.

The shuttle 14 is pivotally mounted on the pivot bar 23 to displace the rake toward and away from the bar screen by a pair of channel systems 30 mounted on the inner surfaces of the frame 20. The upper end of the shuttle 14 carries a transverse bar 31 having channel followers 32 at both ends. Each channel system 30 includes a pair of parallel channels 33 and 34 for guiding the followers 32 and pivotally controlling the shuttle 14.

During the upward travel of the shuttle, the shuttle is oriented to maintain the rake in interfacing, cleaning relation with the bar screen by the accommodation of the channel followers 32 within the guide channels 33. During the downward travel of the shuttle, the shuttle is oriented to maintain the rake displaced from the bar screen by the accommodation of the channel followers within the guide channels 34.

The shuttle 14 is pivoted automatically at its uppermost position to move the rake out of cleaning relation with the bar screen in preparation for its descent into the channel and at its lowermost position to move the rake into cleaning relation with the bar screen. This is accomplished at the upper end, as best shown in FIG. 6, by spring-urged gates or switches 36 which yield to permit the channel followers 32 to travel to the upper ends of the guide channels 33 and then cam the channel followers into the guide channels 34 during the downward travel of the channel followers. At the lower end, as best shown in FIG. 8, the channel followers are displaced by cams 37 from the channel 34 to the channel 33 through spring-centered gates or switches 38 which yield to permit passage of the channel followers and then close with their lower beveled ends in engagement with the lower ends of the cams 37 to guide the channel followers 32 upwardly in the guide channels 33 during the upward travel of the shuttle 14.

The reversal of the motor 15 to reverse the direction of the shuttle at each end of its stroke is controlled by upper and lower reed-type switches 40 and 41. When the shuttle is in its uppermost position, a magnetic strip 42 carried at the end of the shaft 31 actuates the arm of the switch 40 to reverse the direction of the electric motor to lower the shuttle and the rake carried thereby. When the shuttle is in its lowermost position, the magnetic strip 42 actuates the arm of the switch 41 to again reverse the direction of the electric motor. Alternatively, the switches can be actuated by engagement of the channel followers with the switch arms.

The flexible train driven by the motor at or near the upper end and supporting the shuttle 14 at or near the lower end confines the motor end of the train to the upper curved guide track while the lower end of the train raises and lowers the shuttle. As explained, this greatly facilitates the ease and safety of servicing the shuttle transport system.

A wiper 45, shown in FIGS. 1 and 3, is provided above the platform 10 adjacent the opening 10a to wipe the debris from the rake in its elevated position and deposit the debris on the platform. The wiper 45 is pivotally actuated to sweep the debris off the rake by the solenoid 46 through a pivotal bell crank lever 47. The solenoid 46 can be actuated by the switch 40 or by another switch that senses the position of the rake in position to be wiped.

Figure 10:
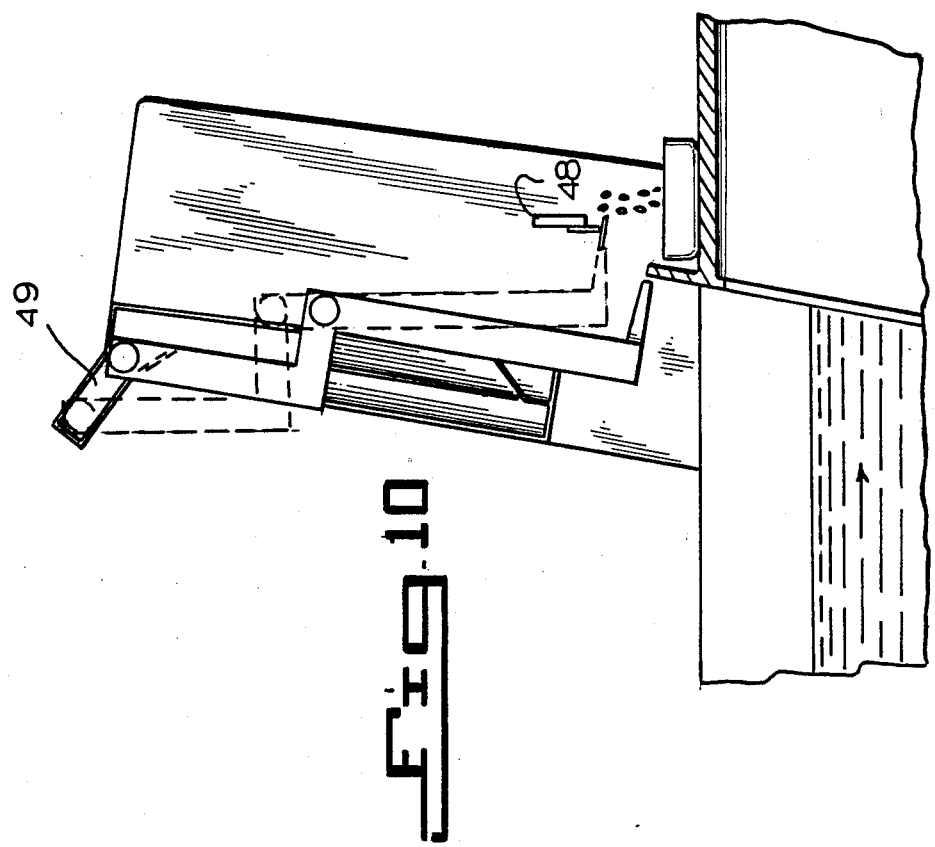
FIG. 10 is an elevational view of an alternative embodiment of a guide channel system for use with a cleaning wiper.
Figure 9:
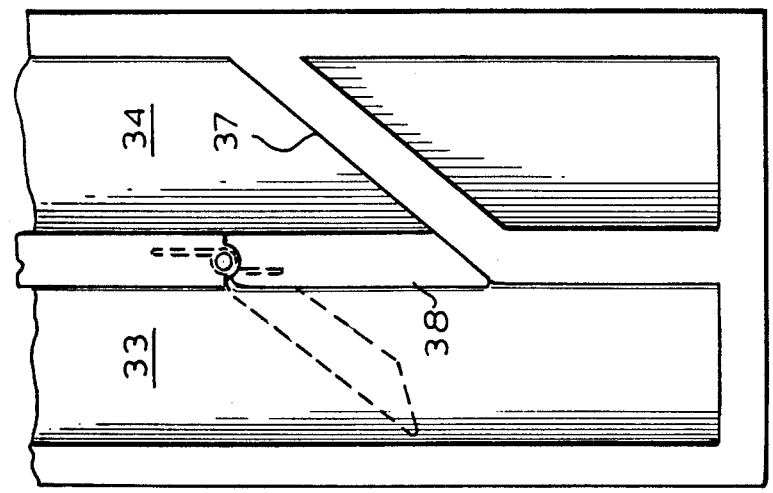
FIG. 9 is an elevational view of the lower end of the guide channel system.

An alternative wiper for the rake is shown in FIG. 10. In this embodiment a fixed wiper 48 is provided and an oblique channel extension 49 is provided at the upper end of the channel 33 to pivot the shuttle back and forth and thereby displace the rake relative to the stationary wiper.

Another wiper system is shown in FIG. 11 in which a wiper blade 50 is supported between a pair of arms 51 which are pivotally mounted in bearings 52 to the frame 20. The free ends of the arms 51 carry counterweights 53 which urge the wiper blade to a lowermost position in which the arms and wiper blade are supported by shock absorbers 54. In the raised position of the shuttle, the rake moves into engagement with the wiper blade, and the counterweights resist upward displacement of the wiper blade and cause the wiper blade to apply the necessary wiping force on the rake to clean it. After the wiper action the shock absorbers permit the arms to gradually lower the wiper blade and restore it to its initial position.

The invention has been shown in preferred forms and by way of example, and many modifications and variations can be made therein within the spirit of the invention. The invention, therefore, is not intended to be limited to any specified form or embodiment, except insofar as such limitations are expressly set forth in the claims.

I claim:

1. A bar screen cleaning apparatus mounted on a platform adjacent an access opening to a waste water channel for cleaning a bar screen of debris deposited thereon by the flow of waste water, comprising: a rake, a shuttle for supporting the rake, a motor-driven train connected to the shuttle for raising and lowering the shuttle to move the rake relative to the bar screen, a track for guiding the motor-driven train, said track extending substantially parallel to the bar screen at the lower end of the track to displace the rake in cleaning interfacing relationship with the bar screen during the upward travel of the train and curving at the upper end to transport the train above and across the platform so that the entire length of the train in the raised position of the shuttle is readily accessible to maintenance personnel from the platform, said train including a motor drive, a flexible connection between the motor drive and the shuttle and track engaging and following means carried by the flexible connection at spaced apart distances between the motor drive and the shuttle, and curved guide means for the flexible connection to maintain the track engaging and following means in engagement with the track and to guide the flexible connection along the path of the curved track.

2. A bar screen cleaning apparatus as set forth in claim 1 1 including means pivotally connecting the shuttle to the lower end of the flexible connection of the train so that the upper end of the train is traveling along the curved portion of the track while raising the shuttle and including a channel guide for pivoting the shuttle to control the displacement of the rake relative to the bar screen and the platform as the shuttle is raised and lowered by the motor-driven train.

3. A bar screen cleaning apparatus as set forth in claim 2 in which the shuttle carries a channel follower and the channel guide includes a pair of channels, one said channel guiding the channel follower to position the rake in cleaning interfacing relationship with the bar screen when the shuttle is raised and the other channel guiding the channel follower to position the rake displaced from the bar screen when the shuttle is lowered.

4. A bar screen cleaning apparatus as set forth in claim 3 including switch means at the upper and lower ends of said channels to permit passage of the channel follower in one direction and to cam the channel follower into the other channel in the other direction.

5. A bar screen cleaning apparatus as set forth in claim 4 including means controlled by the shuttle at the upper and lower positions thereof to reverse the direction of the motor drive for the train.

6. A bar screen cleaning apparatus as set forth in claim 3 including a rake wiper for removing debris from the rake and depositing the debris on the platform and in which the upper end of the channel which guides the channel follower in the upward travel of the shuttle displaces the rake relative to the wiper.

7. A bar screen cleaning apparatus as set forth in claim 1 in which said motor drive includes a motor and a motor-driven shaft and including curved guide means for the motor to guide and hold the motor against rotation as said motor displaces the train along the guide track.

8. A bar screen cleaning apparatus as set forth in claim 1 in which the flexible connection includes links and transverse rods connecting the links, said rods being guided at their ends by said track engaging and following means and by said curved guide means for the flexible connection.

9. A bar screen cleaning apparatus as set forth in claim 1 in which said track is a gear rack, the entire length of which is readily accessible to maintenance personnel from the platform, and said motor drive for the train includes a motor-driven shaft carrying a pinion in engagement with the gear rack and in which the ends of the motor-driven shaft are guided by said curved guide means for the flexible linkage.

10. A bar screen cleaning apparatus as set forth in claim 1 including a rake wiper for removing debris from the rake and depositing the debris on the platform and means for displacing the rake wiper.

11. A bar screen cleaning apparatus as set forth in claim 1 including a rake wiper for removing debris from the rake and depositing the debris on the platform, means supporting the rake wiper for upward movement from a position of rest and means resisting said upward movement and restoring the rake wiper to the position of rest.

12. A bar screen cleaning apparatus as set forth in claim 11 including shock absorbing means resisting the abrupt restoration of the rake wiper.

* * * * *